No. 891,071. PATENTED JUNE 16, 1908.
R. HUBER.
BICYCLE.
APPLICATION FILED OCT. 12, 1907.
Fig. 1.
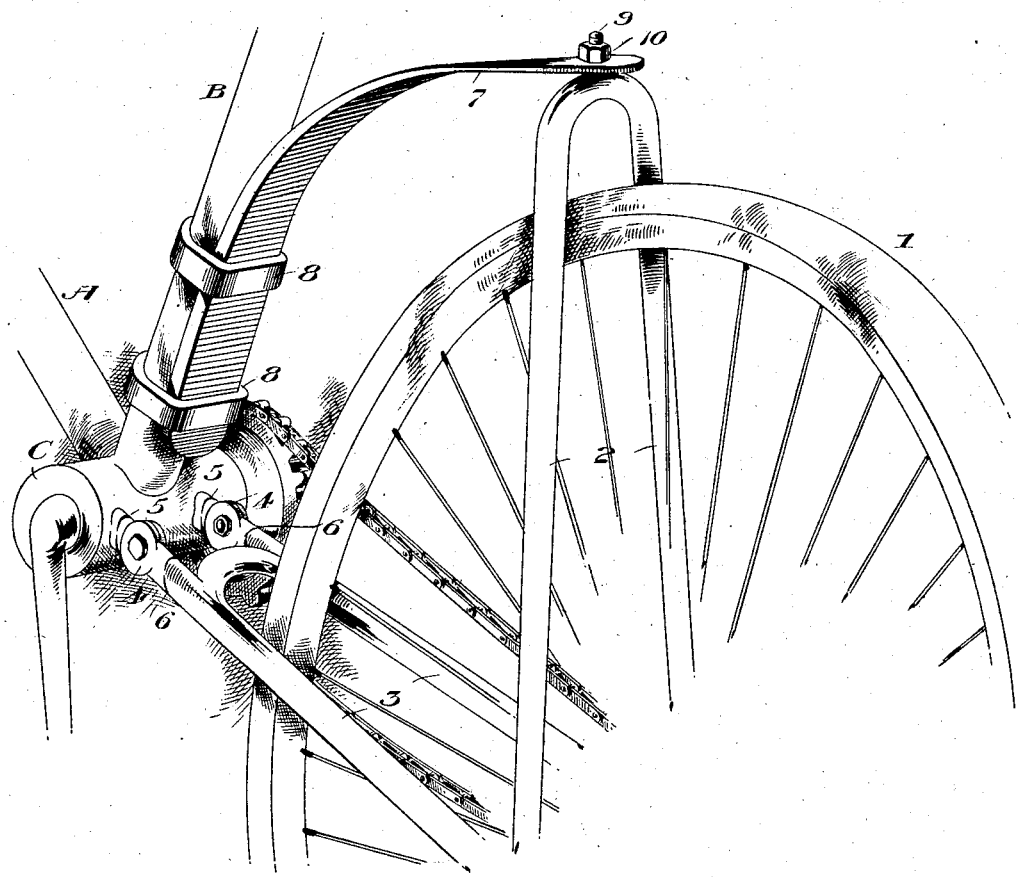
Fig. 2.
Fig. 3.
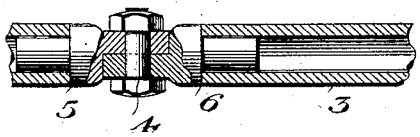
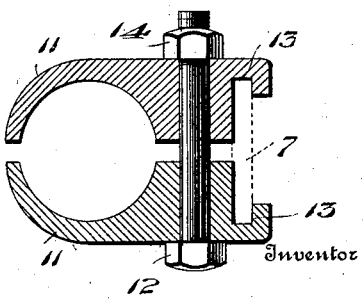
Witnesses
Inventor
Raymond Huber
By Louis Bagger & Co.
his Attorneys

UNITED STATES PATENT OFFICE.

RAYMOND HUBER, OF NORTH PLAINFIELD, NEW JERSEY.

BICYCLE.

No. 891,071.  Specification of Letters Patent.  Patented June 16, 1908.

Application filed October 12, 1907. Serial No. 397,127.

*To all whom it may concern:*

Be it known that I, RAYMOND HUBER, a citizen of the United States, residing at North Plainfield, in the county of Somerset and State of New Jersey, have invented certain new and useful Improvements in Bicycles, of which the following is a specification.

My invention relates to an improvement in bicycles and more particularly to a cushioning means, an object being to provide a spring so connected to the rear wheel that it will relieve the jar due to rough roads and at the same time afford a means for holding the rear wheel in its position.

The invention relates to certain other novel features of construction and combinations of parts which will be hereinafter described and pointed out in the claims.

In the accompanying drawings Figure 1 is a perspective view showing the rear wheel attached to the frame, Fig. 2 is a sectional view through the hinge joint from the hub of the crank shaft to the connecting arm of the rear wheel and Fig. 3 is a modification.

A represents the frame of a bicycle and B is the upright extending from the hub C of the crank shaft.

The rear wheel 1 has the usual V shaped connecting members 2, 3. The arms 3 have a hinge joint 4 which is connected to the hub of the crank shaft at 5 and to the arm 3 at 6. This hinge joint is preferably linked together and the connections 5 and 6 to the arm 3 and the hub of the crank shaft can either be connected by means of pins or the joint could be welded to the parts.

A heavy steel spring 7 is connected to the upright B by means of couplings 8, 8 which are movable on the upright so that the spring can be adjusted to suit the requirements. The opposite end of the spring is secured to the arms 2 by means of a bolt 9 and nut 10.

This invention is intended to be applied to motor cycles or any kind of a bicycle and the form just described is intended to be placed upon a bicycle or motor cycle as it is being manufactured but to accommodate any cycle to which it is desired to apply my invention I have shown a form of coupling in Fig. 3 having two jaws 11, 11 which have their inner surface rounded to conform to the shape of the upright B and through the jaws a bolt 12 passes whereby the jaws can be drawn tightly around the upright. Slots 13 are formed in the rear of the clamp for the reception of one end of the steel spring which is inserted in the slots at the same time the jaws are placed around the upright B whereby both the spring and the upright can be held tightly within the jaws of the clamp when the nut 14 is screwed upon the bolt 12.

From the foregoing will be seen that I provide a very simple attachment which can be applied to any cycle and which will relieve the jar of rough roads and especially the jar due to the engine of motor cycles.

It is evident that slight changes might be resorted to in the form and arrangement of the several parts described without departing from the spirit and scope of my invention, and hence I do not wish to limit msyself to the exact construction herein set forth; but:

Having fully described my invention and what I desire to secure by Letters Patent, is:

1. In a bicycle, the combination with a frame and upright, of V-shaped connecting members affording support at their rear angles for one of the wheel axles, the lower arms of said members being connected at their forward ends directly to the frame of the bicycle, and a spring connecting the ends of the upper arms of said members with the upright and constituting the sole means of connection between said members, and couplings connecting the spring to the upright and movable on the latter, whereby the spring may be adjusted to suit the requirements.

2. In a bicycle, the combination with a frame and upright, of V-shaped connecting members affording support at their rear angles for one of the wheel axles, the lower arms of said members being connected at their forward ends directly to the frame of the bicycle, and a spring connecting the ends of the upper arms of said members with the upright and constituting the sole means of connection between said members, couplings connecting the spring to the upright and movable on the latter, whereby the spring may be adjusted to suit the requirements, and a bolt for connecting the outer end of the spring with the upper arms of the V-shaped members.

In testimony whereof I affix my signature in presence of two witnesses.

RAYMOND HUBER.

Witnesses:
WM. O. WORTH,
LEANDER W. HAMMOND.